(12) United States Patent
Giger et al.

(10) Patent No.: US 9,668,490 B2
(45) Date of Patent: Jun. 6, 2017

(54) DEVICE AND METHOD FOR THE CONDENSATION OF A VAPOR IN A VACUUM CHAMBER

(71) Applicants: Ulrich Giger, Bubikon (CH); Florian Bäbler, Mollis (CH); Kaspar Bäbler, Mollis (CH)

(72) Inventors: Ulrich Giger, Bubikon (CH); Florian Bäbler, Mollis (CH); Kaspar Bäbler, Mollis (CH)

( * ) Notice: Subject to any disclaimer, the term of this patent is extended or adjusted under 35 U.S.C. 154(b) by 164 days.

(21) Appl. No.: 14/341,342

(22) Filed: Jul. 25, 2014

(65) Prior Publication Data

US 2015/0037483 A1 Feb. 5, 2015

(30) Foreign Application Priority Data

Aug. 1, 2013 (EP) .................................... 13178986

(51) Int. Cl.
| | | |
|---|---|---|
| *F25D 31/00* | (2006.01) | |
| *A21D 15/02* | (2006.01) | |
| *A23L 3/3418* | (2006.01) | |
| *A23L 3/36* | (2006.01) | |
| *B01D 5/00* | (2006.01) | |
| *F28B 3/06* | (2006.01) | |
| *F28B 9/02* | (2006.01) | |

(52) U.S. Cl.
CPC ............ *A21D 15/02* (2013.01); *A23L 3/3418* (2013.01); *A23L 3/36* (2013.01); *A23L 3/364* (2013.01); *B01D 5/0045* (2013.01); *F25D 31/00* (2013.01); *F28B 3/06* (2013.01); *F28B 9/02* (2013.01)

(58) Field of Classification Search
CPC ..... F25D 2317/043; A23L 3/02; A23L 3/0155
USPC .......................................... 62/100, 169, 268
See application file for complete search history.

(56) References Cited

U.S. PATENT DOCUMENTS

| | | | |
|---|---|---|---|
| 996,991 A | 7/1911 | Little | |
| 2,696,775 A | 12/1954 | Dean | |
| 4,061,483 A | * 12/1977 | Burg | A23B 4/066 165/223 |

(Continued)

FOREIGN PATENT DOCUMENTS

| | | |
|---|---|---|
| DE | 10 17 593 | 10/1957 |
| EP | 0 686 400 A1 | 12/1995 |

(Continued)

OTHER PUBLICATIONS

European Search Report from European Patent Office in related EP Application No. 13178986.9-1605, dated Feb. 5, 2014.
European Search Report for EP 14 17 9208 dated Nov. 6, 2014.

*Primary Examiner* — Cassey D Bauer
(74) *Attorney, Agent, or Firm* — Smith, Gambrell & Russell, LLP

(57) ABSTRACT

A vacuum cooling device for the cooling of foodstuff, in particular hot bakery products comprises a vacuum chamber (2) containing a product chamber (7) for receiving the foodstuff for its cooling and a separation chamber (28), a vacuum source (3), such as a vacuum pump which is connected to the separation chamber (28) and a vapor condenser (4) for condensation of vapor generated during the cooling process in the product chamber. The vapor condenser comprises a cooling medium in a sump (11) and comprises a vapor introduction element (8, 9, 10) for introducing the vapor into the cooling medium.

20 Claims, 8 Drawing Sheets

(56) References Cited

U.S. PATENT DOCUMENTS

| | | | | |
|---|---|---|---|---|
| 4,229,886 A | * | 10/1980 | Durant | F26B 5/048 |
| | | | | 219/686 |
| 5,235,903 A | | 8/1993 | Tippmann | |
| 5,946,919 A | | 9/1999 | McKinney et al. | |
| 6,148,875 A | * | 11/2000 | Breen | B65B 25/046 |
| | | | | 141/192 |
| 2011/0300278 A1 | * | 12/2011 | Schwartz | A23L 3/36 |
| | | | | 426/472 |

FOREIGN PATENT DOCUMENTS

| | | |
|---|---|---|
| JP | 11 211314 A | 8/1999 |
| JP | 2001 221546 A | 8/2001 |
| JP | 2007192459 | 8/2007 |
| JP | 2010133569 | 6/2010 |
| WO | 97/32113 A1 | 9/1997 |

\* cited by examiner

DEVICE AND METHOD FOR THE CONDENSATION OF A VAPOR IN A VACUUM CHAMBER

BACKGROUND OF THE INVENTION

The invention relates to a vacuum cooling device for foodstuff in particular bakery products which is suitable for condensation of a vapor, in particular of water vapor. A vacuum cooling device for foodstuff, in particular bakery products, for example freshly baked bread under a negative pressure comprises a vacuum chamber, which is configured for receiving the fresh foodstuff for the purpose of cooling; a vacuum source, for example a vacuum pump which is connected with the vacuum chamber to discharge the vapor from the vacuum chamber and to generate a negative pressure in the vacuum chamber and a vapor condenser.

It is known to provide devices for the condensation of solvent vapors of vacuum distillation apparatus or vacuum evaporators from DE 1 017 593 B. Such a device contains a tube coil or a tube bundle in which the vapors to be condensed circulate. The tube coil is directed into a receiving vessel, which is used for receiving the condensate. If the vapors of the tube bundle are not condensed completely by the water bath, the vapors collecting in the receiving vessel are condensed in an auxiliary condenser. This condenser is also arranged in the water container inside a displacer. The auxiliary condenser can contain an absorption means, by which humidity is absorbed. Due to the fact that it relates to solvent vapors, which should be condensed by this device, it is mandatory that the cooling medium and the solvent vapors to be condensed don't come into contact with each other. Such a requirement doesn't apply to foodstuff, therefore this device is not suitable for the vacuum cooling of foodstuff.

A condenser for high pressure vapor is known for vapor engines from WO97/32113, which consists of a pressure vessel, in which a vapor is introduced by a vapor supply conduit. The vapor is introduced by a distributor directly into the water bath. The distributor has a plurality of distribution tubes which extend into the water bath. The distribution tubes are in contact with the water bath via a plurality of small openings, such that vapor is introduced through the openings into the water bath in the form of bubbles, where its condensation occurs.

Hot and humid foodstuff can be cooled very efficiently in a vacuum chamber that means only a short period for cooling is required. However during the evacuation process a very large volume of vapor is generated, which can amount to a multiple of the chamber volume. In a vacuum chamber, which has a chamber volume of 4 up to and including 6.6 m$^3$ the vapor volume can amount up to be a hundred fold of the chamber volume.

The capacity of the vacuum pump is determined by the vapor volume. That means the vacuum pump has to be configured such that the entire vapor volume leaves the vacuum chamber via the vacuum pump. An example for a vacuum pump 1 for a vacuum cooling chamber 2 is shown in the document JP11-211314. The vacuum pump 1 is designed according to the principle of a venturi pump, which sucks the air from the vacuum cooling chamber by the water pressure of the water flowing through the venture nozzle of the venturi pump. According to the principle shown in JP11-211314 the air from the vacuum cooling chamber is received in a water flow and transported away. No vapor condensation is performed by this method. The power of the vacuum recirculation pump 8, which is needed for operating the venturi pump 1 has to be dimensioned for the entire air flow containing the vapor and has thus to be of a large size. In order to reduce the amount of vapor which has to be handled by the vacuum pump, vapor condensers are added to the vacuum conduits. An example for such a solution is shown in the U.S. Pat. No. 2,696,775. U.S. Pat. No. 2,696,775 shows a vacuum chamber for the cooling of foodstuff, which is combined with a baking oven. After conclusion of the baking process the bakery product is evacuated. Therefore the vapor is evacuated by a conduit, enters a condenser and then a vacuum pump. The condenser is arranged between the vacuum chamber and the vacuum pump and does not form the bottom of the vacuum chamber, such that the vapor is not in contact with the water bath. A further example for a heat exchanger in which a condensation occurs arranged upstream of a venturi pump is shown in JP2001-221546. Such vapor condensers prevent that a portion of the vapor enters the vacuum pump connected downstream thereto, however the vacuum pump has to cope with the entire non condensed vapor volume flow from the vacuum chamber.

Document DE 2902270 refers to a method for cooling a bakery product by decrease of pressure in a cooling chamber. The vapor is sucked from the cooling chamber by means of a vacuum pump. The control of the cooling is such that the pressure is reduced to a set value and in a second phase of pressure reduction to the next lower set value if the measured pressure during a given time interval $\Delta t$ doesn't exceed the set value of more than a given value $\Delta p$. Bakery products of oven temperature can be cooled within a couple of minutes to environment temperature, such that it is resistant to cut and does not form a condensate anymore when packed in plastic bags.

The solution proposed in DE 2902270 causes no change in the capacity requirement of the vacuum pump, it merely allows a more precise control of the vacuum cooling process. A more precise control of the vacuum cooling process can lead to a decrease of the operating period. Thereby the total energy requirement for the vacuum cooling device per batch can be decreased, however, this has none or only a minimal effect on the power required for the vacuum pump.

The document DE 2 301 807 relates to a method for cooling and/or drying of humid foodstuff by means of a vacuum, whereby each of the following are considered for control: the temperature of the foodstuff or the atmosphere surrounding the foodstuff, the pressure the degree of atmospheric humidity or the humidity of the foodstuff after cooling, the degree of saturation of the atmosphere or the time. Thus also this document relates to an improvement of the control of the vacuum cooling device, which takes a multitude of parameters into account.

In the document U.S. Pat. No. 2,072,737 there is described a method for cooling of bakery products in which the crust of the bread is to be held soft and wet. The hot baked bread is cooled during a first period, such that the crust is cooled in portion. Then the bread is cooled further, in that it is introduced into a vacuum surroundings, whereby the vacuum is set such that it is maintained above the vapor pressure of the bread at bread or bread crust temperature.

The document DE 10 2008 035 068 A1 relates to a process for the manufacture of bakery products or fried products, in which a high relative humidity is maintained during the entire dough processing and dough handling and the finished baked hot bakery product is submitted to a vacuum cooling process. The relative humidity is greater or equal to 96%.

AT4002798 describes a method for manufacturing and conservation of prefabricated bakery products. The dough elements are baked partially and are cooled under shock to below 0° C. The dough elements contain 5-15% more water compared to the amount of flour as well as additives binding water. For this reason the baking time can be reduced to about 15-45% and the baking temperature increased to about 5 up to and including 25%. In the hot state, the baking products are subjected to a negative pressure.

Document WO2012082060 describes a vacuum cooling plant for bakery products, which is humidified with low pressure vapor. The device comprises a vapor generator for generating vapor under a sub-atmospheric pressure. The vapor is substantially free from air, whereby the vacuum generator is arranged in connection with the vacuum chamber, such that the generated vapor enters the chamber without contemporaneous air supply.

Thus, in the prior art, nearly the entire water vapor is discharged into the environment by the vacuum pump. As a consequence the throughput through the vacuum pump is increased up to 100 times the volume of the through-put of air. A portion of the water vapor can be used specifically to increase the humidity of the bakery products. This solution is subject to a high energy consumption. Thus a vacuum pump with high capacity has to be used. The power of the pump is usually about 45 kW. The use of such a high capacity vacuum pump has a number of disadvantages in operation next to the high energy consumption.

In the most cases the vacuum pumps to pump the vapor volume are of the oil-lubricated type, due to the fact that they have a high electrical connection value. During the operation of the vacuum pump the vapor which has to be discharged from the vacuum chamber comes into contact with the lubricant. If the vapor condenses before entering the vacuum pump or condenses in the interior of the vacuum pump, a water-oil mixture forms, which forms a stable emulsion. The lubricant has to be heated substantially above the boiling point of water to avoid forming of such an emulsion. The lubricant has a boiling point of above 100° C. The boiling point of the water lies below. The vacuum pump should therefore be operated above the boiling point of water. Thus the entire vacuum pump parts which come into contact with the vapor should have a temperature with is above the boiling point of water that means the water vaporizes under atmospheric conditions. For this reason the vacuum pump has to keep running also when it is not needed for generating a vacuum to generate the necessary heat. An oil emulsion can appear if vapor is in the vacuum chamber, even if the vacuum chamber is not anymore used for performing a vacuum cooling. Thus the vacuum pump should run at least for a further hour after the last vacuum cooling process has been completed. The vacuum pump should be started at least an hour, advantageously 90 minutes before performing a vacuum cooling process to obtain the necessary operating temperature.

A separator can be arranged downstream of the vacuum pump to condense the water vapor. If water vapor condenses already in the vacuum pump, this water vapor is enriched with lubricant. For this reason sticky lubricant residues remain in the water vapor condensate, which can reach the water discharge. Due to the fact that the oil emulsion which is formed by the condensing water vapor in the vacuum pump is stable, it is under certain circumstances not possible to separate it by a conventional oil filter. The separators to be used are bulky, difficult to dewater and to clean.

The use of a powerful vacuum pump can also lead to a phenomenon, in which contaminants, such as dirt particles, fats resulting from the foodstuff or other baking residues are evacuated from the vacuum chamber. Filters can be built in the vacuum conduit between the vacuum chamber and the vacuum pump to prevent that such contaminants from reaching the vacuum pump. However, each filter in the vacuum conduit increases the pressure drop, which is to be considered as of negligible influence in a pressure region of 200 to 300 mbar however, for pressure below 20 mbar, in particular below 5 mbar and below a substantial increase of the pump capacity is required to obtain an evacuation in these lower vacuum ranges.

The condensate of the vapor evacuated from the vacuum chamber is acidic and any machine parts of the vacuum pump made of steel can corrode, if they come into contact with the condensate. Vacuum pump parts as well as filters or separators made of steel can corrode, if they come into contact with the condensate. It is possible to use vacuum pump parts as well as filters or separators made of stainless steel. However it was shown, that also parts made of stainless steel can corrode if condensate accumulates in a dead space. In order to keep the oil temperature all the time above the boiling point of the water, the vacuum pump has to be switched on all the time. Thus an additional energy consumption is required because the vacuum pump has to be switched on all the time, even if it is not needed for the vacuum cooling process.

The progress of the cooling process can influence the quality of the vacuum cooled foodstuff. The progress of the cooling process is defined and monitored in particular by the control of the pressure in the vacuum chamber and optionally a control of the temperature. According to the prior art the pressure control is performed through a control rule which maps progress of pressure over time, that means a pressure curve. The pressure curve is determined by the recipe for the preparation of the foodstuff. Until present the pressure had to be controlled by a valve by a two point control. The valve has substantially two operating states, the closed state in which the connection to the vacuum pump is interrupted and the open state in which a connection to the vacuum pump exists and vapor can be evacuated from the vacuum chamber. That means one of the points of the two point control corresponds to the closed valve, a second one of the points of the two point control corresponds to the opened valve. If the valve opens the pressure is reduced abruptly. This abrupt reduction of pressure may lead to escaping of moisture from the foodstuff which enters the vapor cycle. For this reason various types of foodstuff can't be cooled optimally by this two point control. As a consequence a decrease in quality of the foodstuff has to be accepted. The vacuum pump needs to operate for this simple two point control continuously without interruption.

An object of the invention is to develop a vapor condenser and a vacuum cooling device with a vapor condenser by which a large portion of the vapor generated in the vacuum chamber can be condensed, without risking a contamination of the vacuum pump. It is a further object of the invention to decrease the power requirement of the vacuum pump.

SUMMARY OF THE INVENTION

The object is solved by a vacuum cooling device according to claim 1. Further advantageous embodiments are subject of the dependent claims 2 to 7. A method for solving the problem underlying the invention is subject of claims 8 to 13. A vapor condenser for vacuum cooling of bakery products is subject of the claims 14 and 15.

A vacuum cooling device for the cooling of foodstuff, in particular hot bakery products comprises a vacuum chamber, a product chamber for receiving the foodstuff for its cooling and a separation chamber. Furthermore the vacuum cooling device comprises a vacuum source, e.g. a vacuum pump, which is connected to the separation chamber and a vapor condenser for condensation of vapor generated during the cooling process in the product chamber. The vapor condenser comprises a cooling medium in a sump and comprises a vapor introduction element for introducing the vapor into the cooling medium. The vapor condenser can be arranged directly below the product chamber to receive vapor from the product chamber. It is also possible that the vapor condenser is in fluid connection with the product chamber, but structurally separated from the product chamber, even configured as a separate module.

According to an embodiment, the vapor introduction element is arranged below a chamber floor. The chamber floor is used for receiving the supporting structures for the foodstuff, in particular shelves, containers, chariots and others. The vapor introduction element comprises a plurality of channels or tube elements which extend partially into the cooling medium. That means the cooling medium surrounds the channels or tube elements at least partially. In particular, the vapor condenser is configured as a portion of the vacuum chamber. In particular the vapor condenser is configured as a filter path for retaining contaminants from the vapor.

According to an embodiment a control unit for the amount of condensed water and/or the temperature of the condensed water can be provided. Hereby it can be assured that the channels or tube elements are always submerged into the cooling medium. That means that the vapor which enters the channels or tube elements from above has to pass on its path through the vacuum pump through the cooling medium whereby the vapor condenses in the cooling medium. At the same time any contaminants contained in the vapor condense. The remaining gas, thus the air of low vapor content, enters the separate prion chamber. A separation element can be arranged in the separation chamber. If the air of low vapor content leaves the cooling medium, a splash layer forms. The separation element is used for capturing the droplets from the splash layer and prevents thereby that liquid is sucked into the vapor conduit and reaches the vapor source. The vapor source comprises a vacuum pump whereby the vacuum pump is in particular a vacuum pump with controlled rotary speed. By adapting the rotary speed of the vacuum pump, the pressure curve can be controlled accurately. Thereby any type of pressure curve can be realized by adapting the rotary speed of the vacuum pump accordingly.

According to an embodiment, the sump includes a heat exchanger such that the heat energy of condensation can be used in a heat recovery plant. The heat generated in the vapor condenser can thus be used for other process steps. The recovery of heat is known from an application for vapor sterilizers according to EP0 686 400 A1, however the heat recovery is configured as a heat exchanger which is arranged downstream of a venturi pump. The heat of the mixture of motive steam and the steam extracted from the sterilization chamber is transferred in this heat exchanger to a heat exchange medium and is used elsewhere. This prior art reference thus refers not to heat which has been discharged from a vapor condenser.

A method for the vacuum cooling of a foodstuff comprises the steps: filling a product chamber of a vacuum cooling device with a foodstuff, closing the product chamber, operating a vacuum source for generating a negative pressure, extraction of the cooled foodstuff. The vapor leaving the foodstuff by cooling the foodstuff in the product chamber is condensed in a vapor condenser.

In particular the vapor condenser contains a cooling medium in a sump, whereby the vapor is guided into a vapor introduction element and introduced in the cooling medium. Thereby the cooling medium is charged with vapor and the vapor contains a vapor portion which condenses in the cooling medium. The cooling medium can be in particular water.

The cooling medium can be exchanged periodically or if a predetermined limiting value is reached, in particular if its temperature becomes too high, the concentration of contaminants reaches its maximal value or the pH-Value falls to 4 or less. Thereby the contaminants can be collected in a vapor condenser and can be discharged with the cooling medium or fed into a waste disposal plant.

According to an embodiment the cooling of the cooling medium can be performed by a heat exchanger which is for instance fed with fresh water. According to an embodiment, nearly 60%, advantageously nearly 90% of the water portion of the vapor condenses in the vapor condenser. In particular, contaminants present in the condensate can be enriched and discharged together with the condensate. This variant offers the possibility of a very simple cleaning.

A vapor condenser for a vacuum cooling device according to any of the preceding embodiments contains a sump, which contains a cooling medium in operating state and comprises a vapor introduction element for the introduction of the vapor into the cooling medium, such that the vapor and the cooling medium are in direct contact.

The vapor condenser thus contains a sump, which has a vapor space and a suction space, whereby the vapor space is delimited by a chamber floor. The chamber floor contains at least an opening. Vapor can enter the vapor space through this opening in the operating state. The operating pressure in the sump is smaller than the environmental pressure. The sump contains a cooling medium in the operating state. The vapor condenser contains a vapor introduction element to introduce the vapor into the cooling medium. The vapor introduction element is arranged in the sump below the chamber floor. The vapor introduction element can contain a channel element which contains a plurality of channels, tube elements, a plate element or a channel floor. The vapor introduction element can extend partly into the cooling medium present in the sump or can be arranged above the liquid level of the cooling medium, whereby a cooling medium stream can flow along the vapor introduction element. The vapor introduction element can comprise at least an opening, such that the liquid level of the cooling medium in the vapor introduction element corresponds to the liquid level of the cooling medium in the sump. The sump has a separating element, which separates the vapor space from a suction space, whereby the suction space is connectable to a vacuum generation device, such that the vapor is receivable in the cooling medium from the vapor space by the vapor introduction element, if a subatmospheric pressure is generated by the vapor generation device in the suction space. The water portion of the vapor condenses in the cooling medium to a large portion. An air stream of low vapor content leaves the sump in the direction of the suction space. Advantageously the liquid level of the cooling medium is such that the separation element extends into the cooling medium. Thereby the vapor is forced to find a passage from the vapor space to the suction space through the cooling medium. The separation element can be configured as a wall of the separation chamber.

The vapor introduction element is advantageously arranged below a chamber floor, which is used for receiving the foodstuff. In particular the vapor introduction element comprises a plurality of channels or tube elements which partially extend into the cooling medium. The vapor can contain contaminants, which are receivable from the cooling medium, such that the cooling medium is formed as a filter path for retaining the contaminants.

It can be dispensed with any supply of moisture, thus any additional water or water vapor for instance in the form of spray mists into the vacuum chamber. An increase of the water content of the baking products can be provided if the baking products have to have a particular wet surface. The water content in the baking products is desired as the baking process can be concluded faster. However, a too big pressure difference, in particular a sudden pressure difference as occurring with a two-point control can have the consequence that the moisture from the interior of the foodstuff reaches the surface and thus reaches the vacuum chamber and the vapor condenser with the vacuum cycle.

According to an embodiment the vapor condenser is an integral part of the vacuum chamber. The vapor condenser contains according to this embodiment a water bath on the floor of the vacuum chamber. At the same time the vacuum condenser is used as a dirt filter, due to the fact that dirt particles carried with the vapor condensed in the water bath and are carried away with the condensate. Such a dirt filter is for example known in the field of vacuum cleaning. The U.S. Pat. No. 996,991 shows a vacuum cleaner in which the aspired air is guided first over a vacuum cleaner bag and passes a water bath after having passed the vacuum cleaner bag. This device of U.S. Pat. No. 996,991 is not suitable for a vapor, that means an air stream which contains water vapor, because the vacuum cleaner bag would become moist due to the vapor and consequently the dirt particles would stick onto the wall of the vacuum cleaner bag. The pores of the vacuum cleaner bag would be closed rapidly, whereby the pressure drop increases notably, which requires a very powerful vacuum pump. The solution of U.S. Pat. No. 996,991 is not applicable for the present vacuum cooling device due to the fact that the power of the vacuum pump should be reduced.

The condensation heat energy can be used, that means a device for heat recovery can be provided. The heat recovery can be used for heating or for preheating of the process water. During the vacuum cooling water vaporizes in the foodstuff and for this reason they are cooled. The process for processing bakery products runs as follows. The bakery products are baked for up to 60 min, whereby after about ⅔ of the time a drying process follows the baking process. That means according to this example the baking process takes about 40 min and the drying process takes about 20 min.

The entire water vapor volume is guided through a water bath within the vacuum chamber, thereby the vapor condenses and heats the water. The heat energy generated thereby can be extracted from the water bath by a chiller and can be used for generating hot water or for heating purposes.

The temperature of the water bath is supervised and guarantees a reproducible vacuum process. The water bath has a good filter effect, so that baking residues etc. can't reach the vacuum pump.

The condensed water obtained is acid and is diluted in the water bath, as the water portion of the vapor is incorporated by the cooling medium. Due to the fact that water is used as a preferred cooling medium, a dilution of the acid condensed water occurs by the cooling medium in the sump. The cooling medium is discharged by a cooling medium discharge conduit. Baking residues etc. in the cooling medium can be discharged by occasional settling of the cooling medium.

Due to the fact that the contaminants, such as baking residues accumulate with time in the cooling medium and thus in the sump of the vapor condenser, restrictions in the operation of the vapor condenser can follow. Therefore by refilling the water bath, an internal cleaning process of the vacuum chamber, including the separation chamber, the product chamber and the vapor condenser occurs.

A direct bypass connection conduit can be provided between the vacuum chamber and the vacuum conduit, which can be opened or closed by a bypass valve. If he bypass valve is opened the vapor is not guided over the condenser but is introduced directly into the vacuum conduit. This bypass connection conduit can be used towards the end of the vacuum cooling process, when the vapor contains only little moisture anymore. If the vapor is guided from the vapor condenser directly into the vapor conduit, the pressure drop of the condenser needs not to be taken into account anymore, therefore lower pressures can be obtained in the vacuum chamber.

The embodiments according to the invention have at least some of the subsequent advantages: According to an embodiment the vacuum chamber and the vapor condenser, in particular the water bath form a unity, such that an additional pressure vessel can be dispensed with, what results in an economic advantage.

The cooling medium is used also as a filter path to deposit contaminants extracted with the vapor from the product chamber by condensation in the cooling medium. As a consequence dry running vacuum pumps can be used, because the air with reduced vapor content, which is sucked from the separation chamber, has at most a low level of water vapor and contains no contaminants anymore.

The acidic condensate is diluted as it is received in the vapor condenser by the cooling medium water. Thereby it is less likely to cause corrosive damage on the parts in contact with the condensate.

The condensation heat energy can be used in the production process, for instance in a preheater.

The vacuum process is reproducible. For instance the curve monitoring the proceeding of the vacuum cooling can be saved in an electronic control unit as pressure curve dependent on the cooling time and can be recalled any time again and allows to obtain batches with the same product characteristics by an accurate control of the vacuum pump.

An automatic cleaning of the vapor condenser as well as the product chamber and/or the separation chamber can be achieved by exchanging the water.

The vacuum pump is used energy efficiently, due to the fact that it is only switched on in the working mode during the vacuum process.

By means of a vacuum pump with controlled rotary speed any type of foodstuff can be cooled, that means any type of vacuum cooling curve can be realized, in particular any additional humidification of the foodstuff can be dispensed with. If the vapor condenser is configured as a portion of the vacuum cooling device, an additional pressure container of the water separation in the vacuum conduit can be dispensed with. The vacuum pump is predominantly in operation during the cooling period, due to the fact that the vacuum can be controlled by the rotary speed and the waste air from the vacuum chamber is substantially free from vapor. The vacuum pump needs not to be switched off, it can continue in the standby operating mode. The vacuum pump doesn't perform work in the standby operating mode.

BRIEF DESCRIPTION OF THE DRAWINGS

In the following embodiments of the invention are explained in connection with the drawings. Thereby it is shown in.

Figure 1:
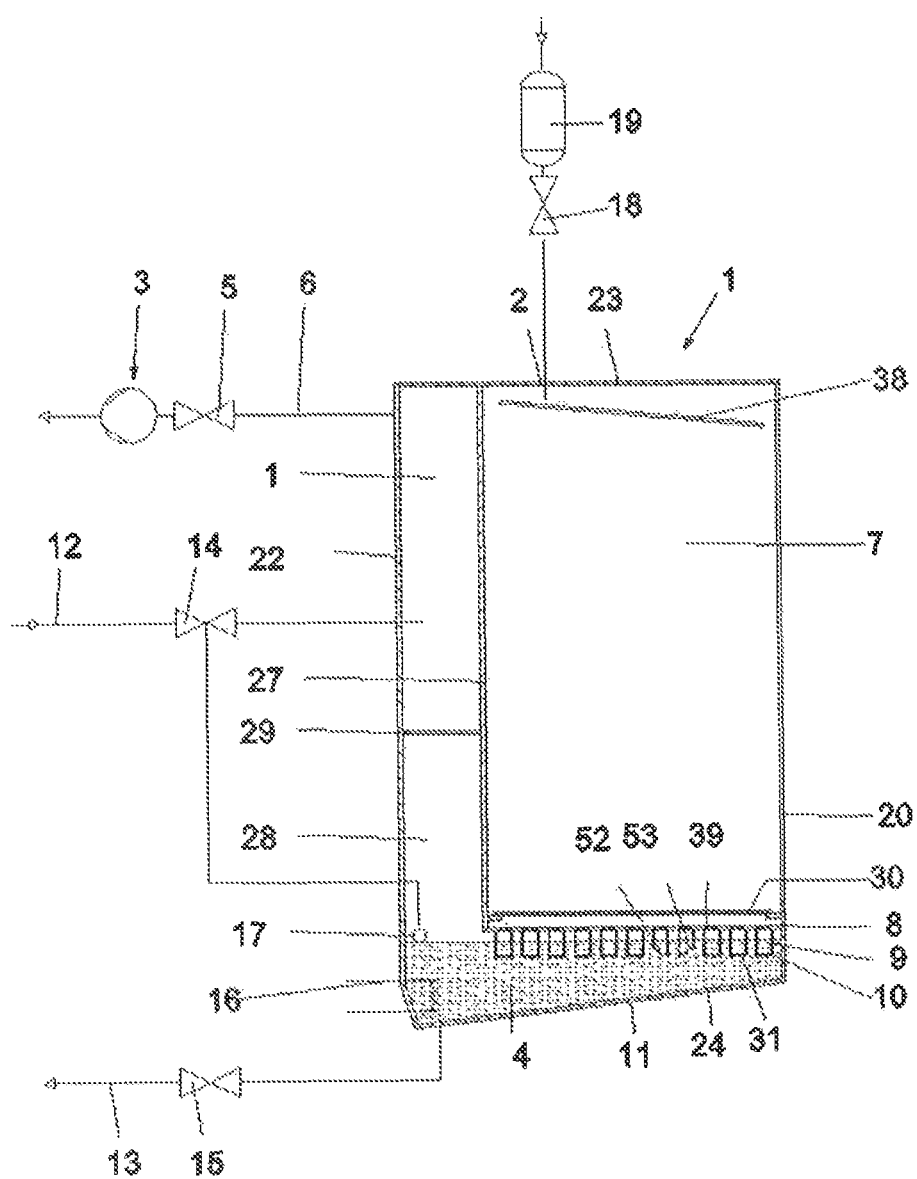
FIG. 1: a sectional view through a vacuum cooling device according to a first embodiment.

The vacuum cooling device 1 shown in FIG. 1 comprises a vacuum chamber 2, a vacuum source 3 and a vapor condenser 4. The vacuum source 3 is a vacuum pump which is in fluid connection with the vacuum chamber 3 via a vacuum conduit 6. A valve 5 is arranged in vacuum conduit 6. The vacuum chamber 3 comprises a product chamber 7, which contains the foodstuff to be cooled in operation. In addition, the vacuum cooling device 1 comprises a separation chamber 28. The separation chamber 28 is arranged next to the product chamber 7 and separated from the product chamber by an intermediate wall 27.

Figure 2:
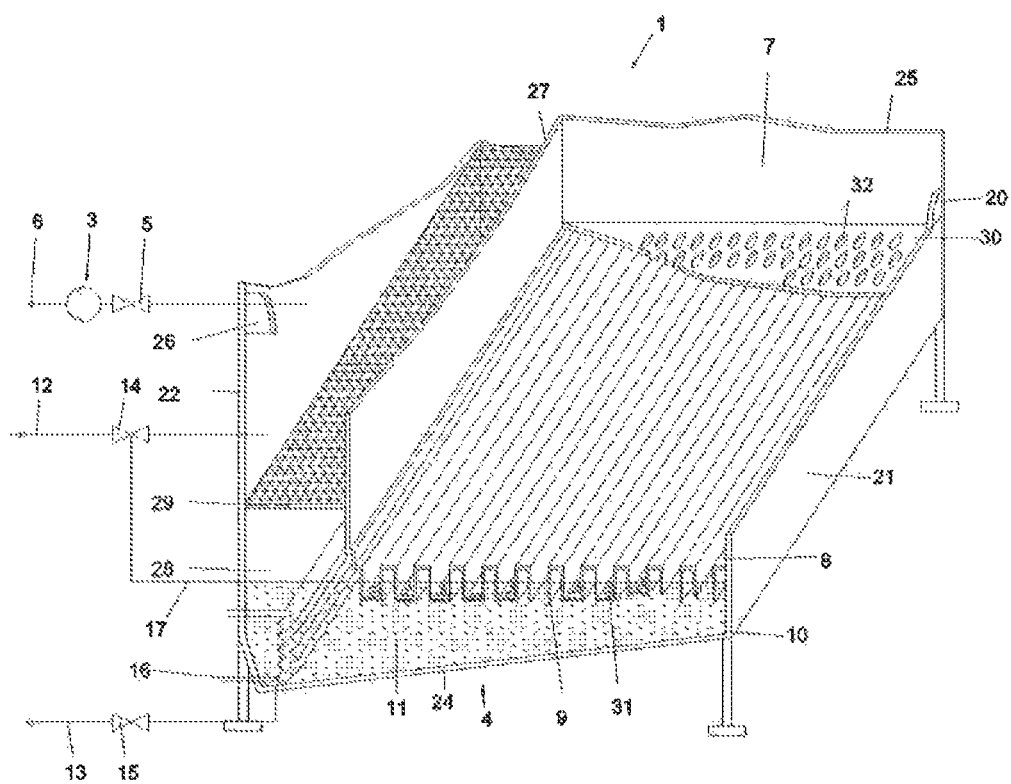
FIG. 2: a view on a vapor condenser according to FIG. 1, FIG. 3: a detail of the vapor condenser.

The vacuum chamber has in the area of the wall 21 or the wall 26 or the wall 25 (see FIG. 2) a door which is not shown and which is opened to place the foodstuff in the product chamber 7 and to extract it after the completion of the vacuum cooling from the product chamber 7. The product chamber 7 can be vented by means of an aeration valve 18, which is arranged above the ceiling 23. The aeration valve is connected by an aeration conduit to the product chamber 7. A filter element 19 is arranged in the aeration conduit to filter contaminants from the fresh air which could impair the quality of the foodstuff. The aeration valve can be configured as a variable throttle element. In can be opened at least partially during the cooling process. During the charge and discharge of the foodstuff, the aeration valve is in an open state, such that a sufficient fresh air supply is guaranteed for persons who are in the product chamber, even if the door of the vacuum chamber 2 is closed. As moisture enters the product chamber together with the fresh air, the fresh air is deflected inside the product chamber by a deflection element 38 in the direction of at least one of the walls 21, 25, 26, 27. The wall 26 is not visible in FIG. 1 due to the fact that it extends in front of the plane of the drawing and the wall 25 forms the rear boundary of the product chamber 7. Both of the walls 25, 26 are shown in FIG. 2. During the cooling process the droplets condense on the surface of the deflection element 38 or on one of the walls 21, 25, 26, 27. The deflection element can be equipped with drain channels or it ends on the lowest point in a position, in which the condensate drops directly to the floor of the chamber. By these measures it can be avoided that the condensate comes into direct contact with the foodstuff.

The vacuum chamber 2 contains the vapor condenser 4, which forms the bottom part of the product chamber 7. The vapor condenser 4 is separated from the product chamber by an intermediate floor 8. A chamber floor 30 is arranged above the intermediate floor 8. The foodstuff is placed on the chamber floor 30 by means of skids. The chamber floor 30 is used as support for a chariot, which carries the skids which form the support surfaces for the foodstuff. A channel floor 10 is provided below the intermediate floor 8 which contains a plurality of channels 9. The channels 9 extend into a sump 11 filled with liquid. The liquid is a cooling medium, which enters the sump 11 via a cooling medium supply conduit 12 and leaves the sump via a cooling medium discharge conduit 13. Habitually water is used as a cooling medium. A cooling medium valve 14 is arranged in the cooling medium supply conduit 12. A cooling medium discharge valve 15 is arranged in the cooling medium discharge conduit 13. Heat is removed from the cooling medium by a heat exchanger 16, whereby said heat can be recovered and supplied in another location or in another step of the process. The level of the cooling medium in the sump 11 is regulated by a level control unit 17 such that at least a portion of the channels 9 is submerged in the cooling medium if vapor is produced in the product chamber 7, which has to be condensed. The heat transfer between vapor and cooling medium occurs in the channels 9 and the cooling medium. Under vapor, a water-vapor air mixture is intended, which is evacuated from the product chamber 7, if a vacuum is applied via vacuum conduit 6.

Cooling medium and vapor are directly in contact as openings 31 are provided in the channels 9. The vapor flows through the openings 31 and reaches the sump 11 filed with liquid. When the vapor and the cooling medium come into contact with water, the water vapor portion condenses immediately. Any contaminants remaining in the vapor remain in the cooling medium which is enriched by contaminants. In this respect the cooling medium serves as a filter path for the vapor.

The air with a reduced water vapor content enters the separation chamber 28. The vapor condenses to a condensate in the channels 9 or also on the path through the cooling medium. The condensate is collected by a collecting channel shown in FIG. 2 and is discharged from the system via a condensate discharge conduit 13.

The air with reduced water vapor content is directed over a separating element arranged in the separation chamber 28. It is to be expected that the bubble migrating in the sump 11 in the direction of the separation chamber 28, a spray layer is formed on the liquid surface. In order to avoid that water splats reach the upper part of the separation chamber 28 and in the vacuum conduit, the separation element 29 is used. This separating element can be a droplet separator, for example a perforated sheet a mesh or knit fabric in which the droplets are retained. A plurality of such separation elements can be arranged in series and/or one above the other. The air with reduced water vapor content is evacuated into the vacuum conduit 6 and enters the vacuum pump 3.

In the embodiment shown in FIG. 2, the vacuum chamber 2 is bounded by a wall 21, in which a door 20 is installed, an opposite wall 22, a back wall 25 and a front wall 26. Only a small edge is seen from the door 20 in this drawing, so as to keep the view of the parts arranged inside the product chamber 7 unobstructed. The vacuum chamber has a bottom floor 24 and a ceiling 23 not shown in FIG. 2. A sealing is arranged between the door 20 and the wall 21, the back wall 25 and the front wall 26 and the ceiling 23, such that the vacuum chamber is closed gas-tightly if the door is closed.

The product chamber 7 has a chamber floor 30. The chamber floor 30 is supported on a ledge of the intermediate wall 27. The chamber floor 30 is only partially shown to show the vapor introduction element 8, 9 of the vapor condenser 4. The chamber floor 30 covers the complete floor area of the product chamber 7. The chamber floor 30 contains openings 32, though which the vapor generated during the vacuum cooling is guided to the vapor condenser.

Figure 4:
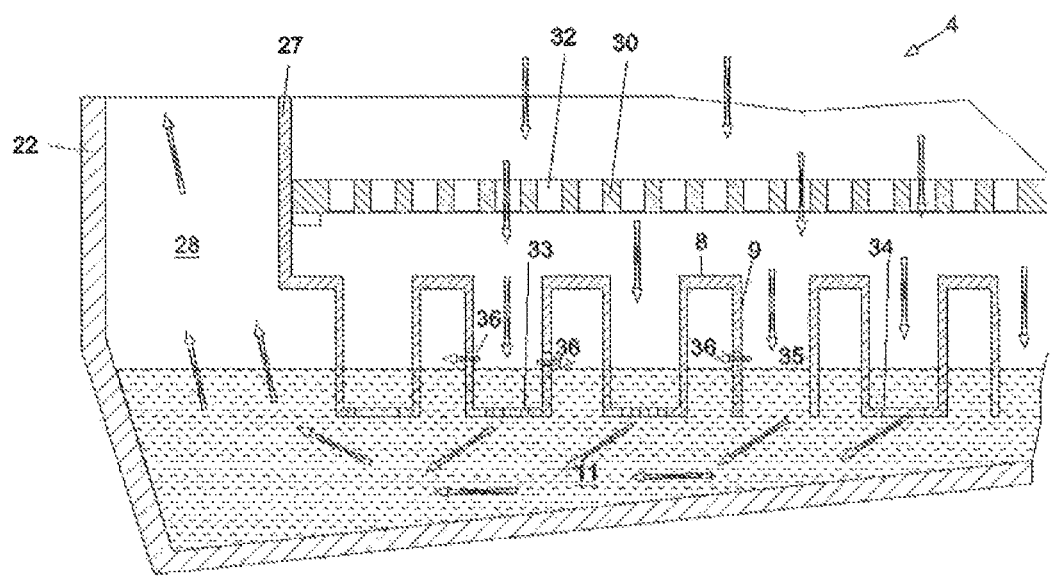
FIG. 4: a detail of the vapor condenser according to a variant.

The vapor introduction element of the vapor condenser 4 is arranged below the chamber floor 30. The vapor introduction element consists of a plurality of channels 9 which are arranged in an intermediate floor 8. The channels extend at least partially into the cooling medium. They contain openings 31, through which a cooling medium can enter the channels 9. These openings are arranged in the channel floor but can also be arranged in a lateral wall of the channel, what is shown in FIG. 4. The openings can be configured for example as circular holes, as slits or a continuous opening. That means the floor of the channel 9 is completely open if the opening is configured as a continuous opening. Alternatively the channels can also run in the interior of tube elements 39, which extend below the intermediate floor 8 into the cooling medium. In FIG. 1 two variants of tube elements are shown. The tube element 39 is a cylinder with a tubular floor which is arranged in a plane substantially parallel to the intermediate floor 8. The tube element 52 has a tubular floor which is arranged in a plane which is arranged in an angle to the intermediate floor. That means the tube element 52 has a tubular floor which submerges into the cooling medium on different portions of its circumference in a different depth. Similar to the tube element 52, the channel 53 can also have a channel floor 10, which is arranged in a plane which extends in an angle with respect to the intermediate floor 8.

Vapor is introduced into the sump 11 by the openings. Thereby the vapor condenses and is absorbed by the cooling medium in the sump 11. The air of low vapor content is guided in the direction of the separation chamber 28. If the air of low vapor content leaves the cooling medium liquid splats are formed. In order to avoid that these liquid splats are entrained with the air flowing in upward direction a separation element 29 is arranged in the separation chamber 28. In the separation element 29, droplets are condensed, in that they are for example retained in a perforated sheet, a mesh or knit fabric. The air of low vapor content passes the separation chamber 28 and is enters the vacuum conduit 6, which is not shown in this figure.

The cross-sectional area of all the openings of the channels is larger than the cross-sectional area of the vacuum conduit. As a result, the flow speed in the channels is smaller than in the vacuum conduit 6.

Figure 3:
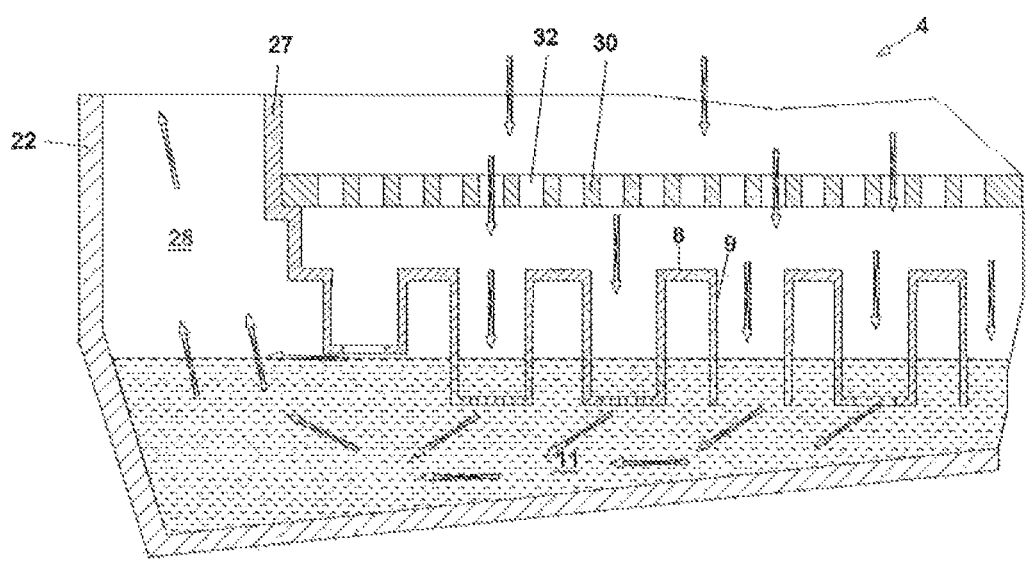

The channels 9 can have various depths. Depending on the level of the cooling medium, a portion of the channels can't be submerged into the cooling medium. FIG. 3 shows a section of a vapor condenser 4, which concerns a detail of the vapor introduction element, which is provided with an intermediate floor 8 and channels 9. The channels 9 extend into the cooling medium in a variable depth. In particular the channel is formed such that with the pictured level of cooling medium it doesn't extend into the cooling medium. Due to the fact that the vapor has less cross-sectional area at its disposal to reach the separation chamber 29, its flow speed increases.

In FIG. 4 a further variant of a vapor condenser 4 is shown. The channels 9 of the intermediate floor 8 contain different types of openings. The openings 33 are for instance configured as circular holes. The openings 34 are configured for instance as elongated holes or slits. Alternatively the channel 35 can also be open, that means it contains no channel floor. In addition lateral openings 36 can be placed in the side walls of the channels 9. Also according to this embodiment the cross sectional area for the flow of vapor from the product chamber 7 is dependent on the level of the cooling medium in the sump 11 of the vacuum condenser 4. In particular the cross-sectional area for the flow of vapor can be increased by the lateral openings 36, if the level of the cooling medium is chosen so high that the lateral openings are at least partially covered. The vapor can enter the cooling medium through the lateral openings 36 and the openings in the channel floor. If the openings are free from cooling medium, that means the level of the cooling medium lies below the lateral openings 36, these openings serve for an exchange with neighboring channel spaces. Due to the fact that the vapor can be introduced unhindered from these channel spaces into the cooling medium, the cross sectional area of the flow for the vapor increases, that means the flow velocity decreases when passing the openings of the channels or the channel spaces. Thus it is possible according to this embodiment to intentionally vary the level of cooling medium to change the flow velocity of the vapor and also the pressure drop. Thus by the control of the level of cooling medium, the pressure curve and also the cooling behavior of the foodstuff can be influenced.

Figure 5:
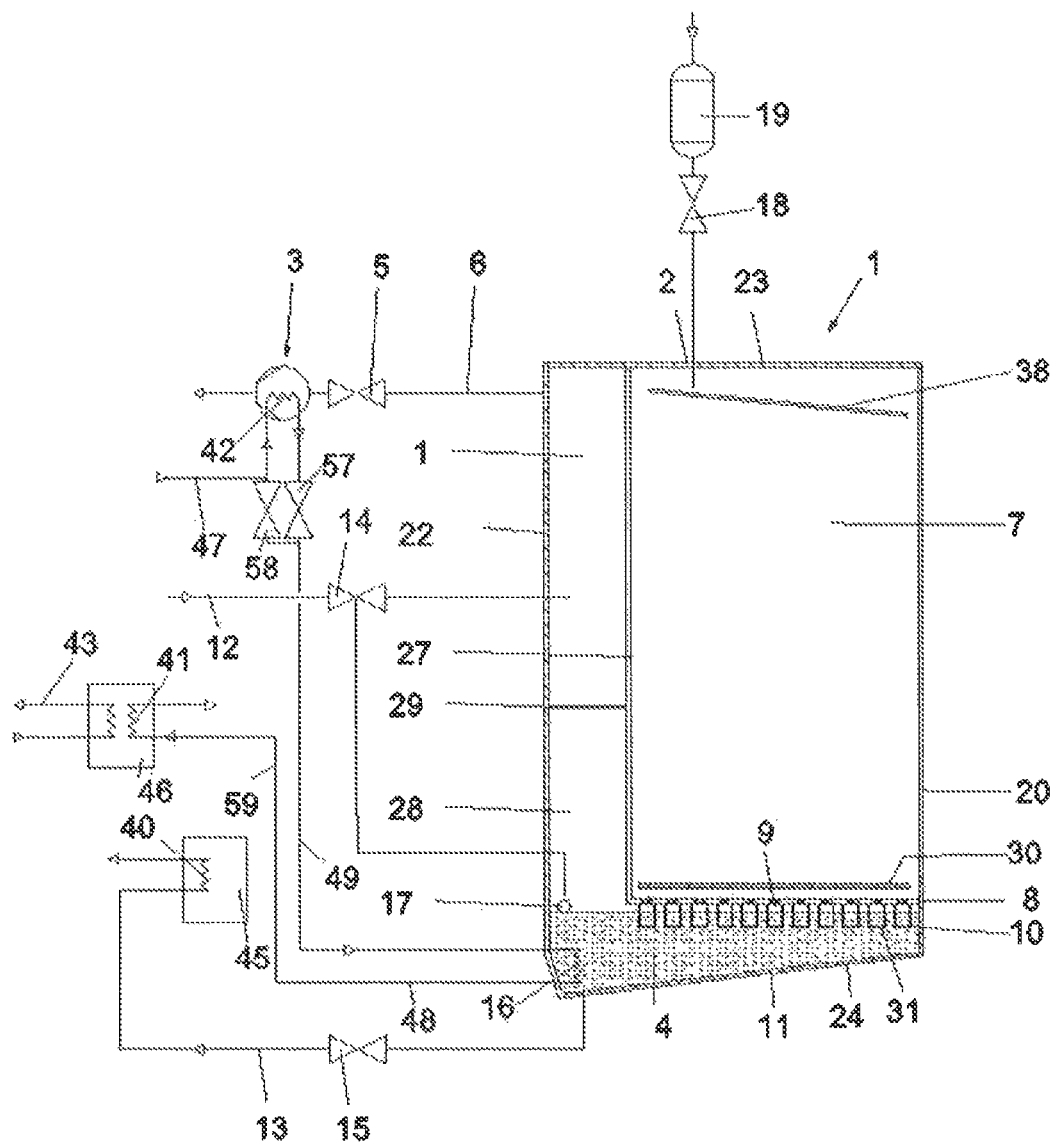
FIG. 5: a section through a vacuum cooling device with heat recovery.

FIG. 5 shows a variant of FIG. 1 with a heat recovery plant. The structural elements which fulfil the same function as in FIG. 1 carry the same reference numbers. In their description it is referred to FIG. 1. At one hand the cooling medium heated up to 60.degree. can be transported over a heat exchanger 40 for the cooling of waste water. The heat exchanger 40 can be arranged in a container 45, through which can circulate a fluid. This fluid can comprise a liquid or gaseous heat exchange fluid. The container 45 can be used in particular as a cooler for waste water. The used cooling medium, which is enriched with contaminants is discharged by the cooling medium discharge conduit 13 and is entered into the sewerage water system. Before entering the sewerage water system, the cooling medium is cooled in that it is fed to the heat exchanger 40. Furthermore a heat exchanger 41 can be provided, which is used for the preheating of a process fluid 43. The process fluid to be heated is guided over a preheater 46, which receives the heat of the heat exchange fluid 59, which leaves the heat exchanger 16 by the discharge conduit 48. The heat exchanger 16 is fed for cooling of the cooling medium in the sump 11 of the vapor condenser 4 is fed by the heat exchange fluid 49 over a feed conduit 47. This feed conduit 47 can lead either directly to the heat exchanger 16 or contain a deviation which adds heat exchange fluids to the vacuum pump 3. The vacuum pump 3 can be cooled by the heat exchange fluid 49, if its operating temperature is increased. Optionally the heat exchange fluid 49, which leaves the vacuum pump, can be fed into the feed conduit 47. Closing means 57, 58 can be provided to couple or decouple the cooling cycle of the vacuum pump 3 with the cooling cycle of the vapor condenser 4.

Figure 6:
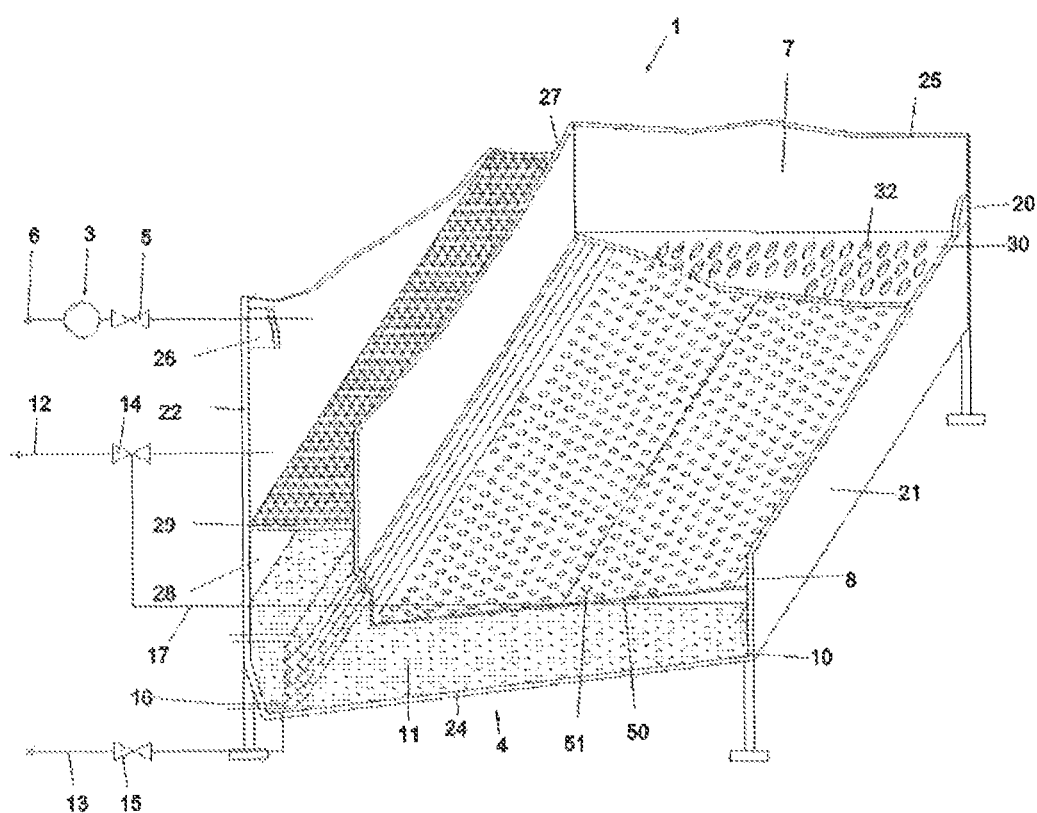
FIG. 6: a view on a vapor condenser according to a second embodiment.

FIG. 6 shows a variant of the intermediate floor 50. The intermediate floor 50 is configured as a planar plate element which is inclined in an angle to the horizontal plane. The plate element is configured with openings 51, which allow for a passage of vapor from the product chamber 7 into the separation chamber 28. The intermediate floor 50 dips at least partially into the cooling medium in the vapor condenser. In particular, the cross-section for the vapor can be increased by openings 51, if the level of the cooling medium rises, such that a larger portion of the openings 51 is at least partially covered. The vapor can enter through openings which are arranged above the level of the cooling medium into the cooling medium. If the openings are free from cooling medium, that means the level of cooling medium lies below the openings 51, these openings are used for the exchange with the vapor space arranged on the underside of the intermediate floor. As the vapor can be entered from this vapor space unhindered into the cooling medium, the flow cross sectional area for the vapor increases, thus its flow velocity decreases when passing the openings of the intermediate floor 50 as well as the vapor space. Accordingly it is possible according to this embodiment to vary the level of the cooling medium on purpose to change the flow velocity of the vapor and also the pressure drop. By a control of the level of the cooling medium, the pressure curve as well as the cooling behavior of the foodstuff can be influenced.

Figure 7:
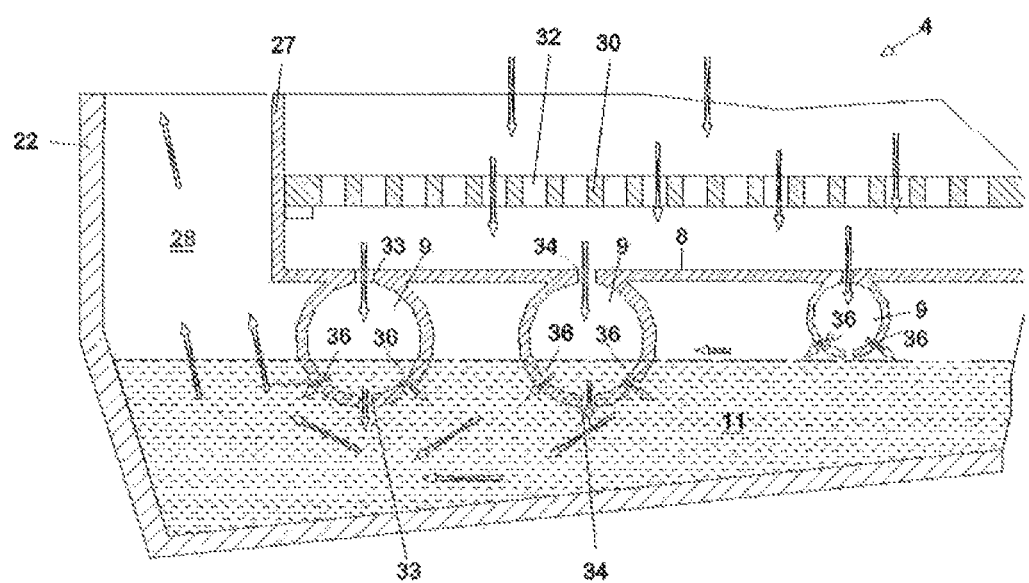
FIG. 7: a detail of the vapor condenser according to a variant

In FIG. 7 a variant of the vapor condenser 4 is shown. The channels 9 of the intermediate floor 8 are configured as tube elements. These tube elements can contain different types of openings. The openings 33 are configured for instance as circular holes. The openings 34 are for instance configured as elongated holes or slits. Alternatively the channel can also be open. That means it contains no channel floor which is not shown in the drawings. In addition in the lateral walls of the channels 9, lateral openings 36 can be provided. Also according to this embodiment, the flow cross sectional area for the vapor from the product chamber 7 is dependent on the level of the cooling medium in the sump 11 of the vapor condenser 4. In particular the cross-sectional area for the vapor can be increased by the lateral openings 36, if the level of the cooling medium is chosen high enough such that the lateral openings are at least partially covered. The vapor can then enter the cooling medium through the lateral openings 36 and the openings on the floor of the channel. If the openings are free from cooling medium, that means the level of cooling medium lies below the lateral openings 36, these openings are used for the exchange with neighboring channel spaces. Due to the fact that the vapor from these cooling spaces can be entered unhindered into the cooling medium, the cross-sectional area for the vapor increases, thus its flow velocity decreases when passing the openings of the channels or the channel spaces. Thus it is possible to vary the level of the cooling medium on purpose in this embodiment to change the flow velocity of the vapor and thus the pressure drop. Thus the pressure curve and the cooling behavior of the foodstuff can be influenced by the control of the level of the cooling medium and consequently the cooling behavior of the foodstuff.

Figure 8:
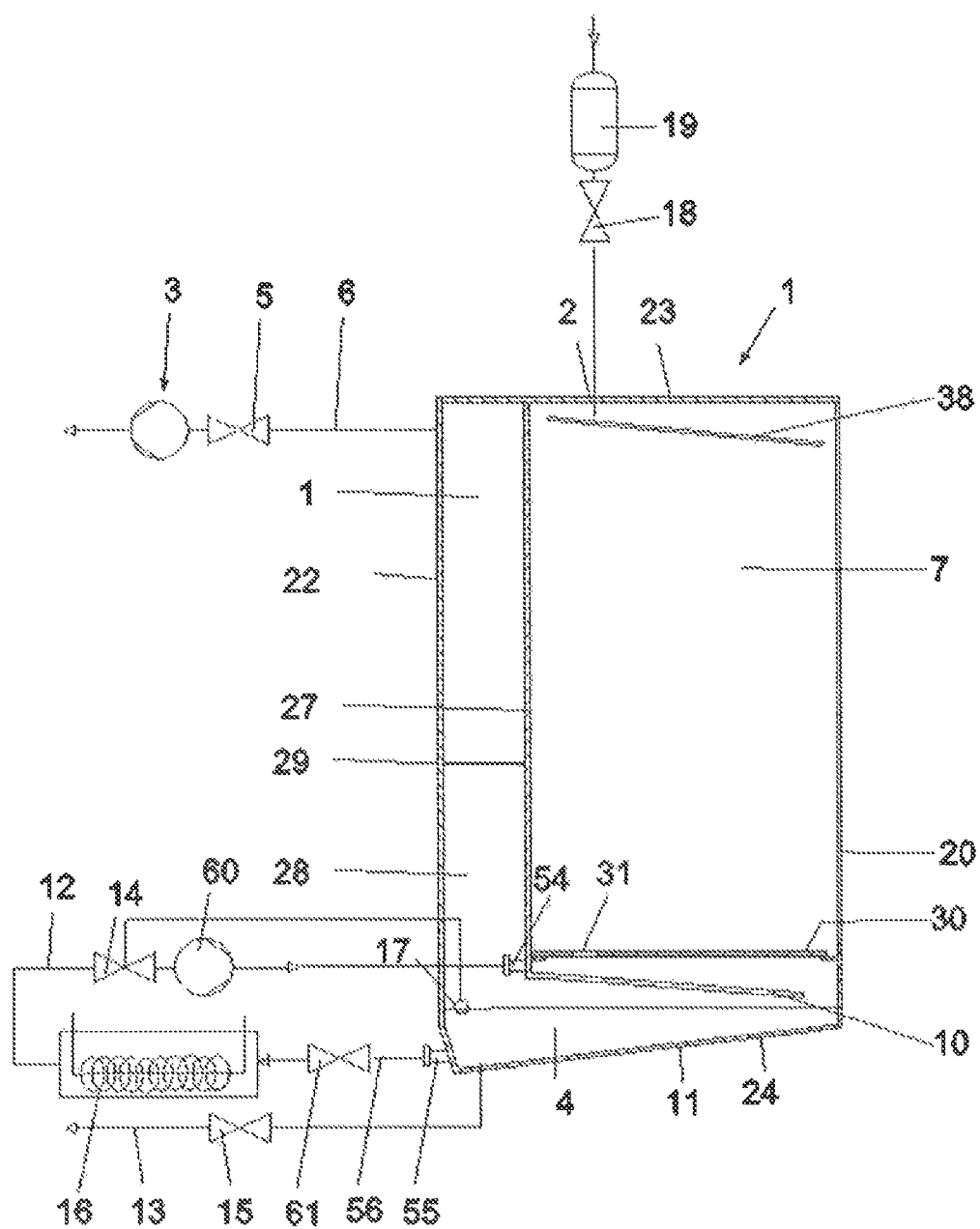
FIG. 8: a sectional view through a vacuum cooling device according to a third embodiment.

The vacuum cooling device 1 according to FIG. 8 comprises a vacuum chamber 2, a vacuum source 3 and a vapor condenser 4. The vacuum source 3 is a vacuum pump, which is in fluidic connection with the vacuum chamber 2 by the vacuum conduit 6. In the vacuum conduit 6, a valve 5 is arranged. The vacuum chamber 2 includes a product chamber 7, which contains the foodstuff to be cooled in the operating state. Furthermore, the vacuum cooling device 1 contains a separation chamber 28. The separation chamber 28 is arranged next to the product chamber 7 and is separated therefrom by an intermediate wall 27.

The vacuum chamber has in the region of the wall 21 or the wall 26 or the wall 25 a door which is not shown, which is opened to position the foodstuff in the product chamber 7 and to extract it after conclusion of the vacuum cooling from the product chamber 7. The product chamber 7 can be aerated by an aeration valve 18, which is arranged above the ceiling 23. The aeration valve is connected by an aeration conduit with the product chamber 7. A filter element 19 is arranged in the aeration conduit to filter contaminants from the fresh air, which could decrease the quality of the foodstuff. The aeration valve can be configured as a variable throttle element. In can be opened at least partially during the cooling process. During the charging and discharging of the foodstuff, the aeration valve is in the opened state, such that for persons who are present in the product chamber, a sufficient fresh air supply is guaranteed even if the door of the vacuum chamber 2 is closed. Due to the fact that humidity reaches the product chamber together with the fresh air, the fresh air is deviated in the product chamber by a deflection element 38 in the direction of at least one of the walls 21, 25, 26, 27. The wall 26 is not visible in FIG. 8 as it is positioned in front of the plane of drawing and the wall 25 forms the rear boundary of the product chamber 7. Both of the walls 25, 26 are shown in FIG. 2. During the cooling process droplets condense on the surface of the deflection element 38 on one of the walls 21, 25, 26, and 27. The deflection element can be disposed with drain channels or it ends on its lowest point in a position, from which the condensate can drop directly onto the chamber floor. By these measures it can be avoided that the condensate comes into contact with the foodstuff.

The vacuum chamber 2 contains a vapor condenser 4, which forms the floor of the product chamber 7. The vapor condenser 4 is separated from the product chamber 7 by the chamber floor 30. Thereby the intermediate floor shown in FIG. 1 can be dispensed with. The foodstuff can be placed in skids on the chamber floor 30. The chamber floor 30 forms a support for a chariot, which carries the skids which form the support surfaces for the foodstuff. Below the chamber floor 30 a channel floor 10 is provided which is formed as a sump 11 filled with liquid. The liquid is a cooling medium which reaches the sump 11 via the cooling medium supply conduit 12 and leaves the sump at least partially by a cooling medium discharge conduit 13. Usually water is used as a cooling medium. A valve 14 can be provided in the cooling medium supply conduit 12, however the provision of such a cooling medium valve is not mandatory. According to this embodiment the cooling medium is circulated in a cooling medium cycle. The cooling medium cycle contains a heat exchanger which can be arranged in the sump 11 or external to the sump 11 e.g. in the separation chamber 28 or even outside of the vacuum cooling device 1. The heat is extracted from the cooling medium by the heat exchanger 16. This heat can be supplied to another step of the process by a heat recovery. The heat exchanger 16 can be configured as a plate heat exchanger as an example. A plurality of heat exchanger can be provided which are arranged in the sump 11, the separation chamber 28 or externally to the vacuum cooling device 1.

A channel floor 10 which is configured as a ramp is arranged between the chamber floor and the bottom floor 24 of the condenser. The chamber floor 30 contains at least an opening 31, by which vapor can enter the interior of the vapor condenser 4.

A cooling medium discharge valve 15 is arranged in the cooling medium discharge conduit 13. The level of the cooling medium in the sump 11 is controlled by a level control 17 in such a manner that the distance between the ramp and the liquid surface can be maintained if vapor is produced in the product chamber 7, which has to be condensed. A liquid flow is generated over the channel floor. This liquid flow is generated by a cooling medium, which reaches the interior of the vapor condenser 4 by a cooling medium supply stub. The channel floor is used as a mass transfer surface. The vapor enters the cooling medium stream and is thereby separated from the air. At the same time the heat transfer between vapor and cooling medium occurs. Under vapor it is intended a water vapor air mixture, which is extracted from the product chamber 7 if a vacuum is applied via vacuum conduit 6.

The cooling medium and the vapor are directly in contact as the vapor is transferred from the opening 31 or the openings onto the surface of the cooling medium stream. The vapor passes the opening or the openings 31 and enters the sump 11 filled with liquid. As soon as the vapor comes into contact with the cooling medium water, the water vapor portion condenses. Any contaminants remaining in the vapor stay with the cooling medium, which is enriched with contaminants. The cooling medium serves as a filter path for the vapor. The air with low vapor content enters the separation chamber 28.

In particular the cooling medium enters the vapor condenser 4 via the cooling medium supply stub 54 below the chamber floor 30. The cooling medium flows along the channel floor 10 configured as a ramp, which serves as a vapor introduction element. The vapor entering through the opening 31 flows parallel to the cooling medium along the channel floor 10. On this path the vapor is in direct contact with the cooling medium. Along this path a mass transfer occurs over the surface of the cooling medium stream by absorbing vapor from the cooling medium stream. The cooling medium stream flows in the manner of a water fall from the lower end of the channel floor 10 in the sump 11. Thereby a splash layer is generated which further increases mass transfer. That means that a large portion of the mass transfer can be already completed if the cycled cooling medium enters from the lower end of the channel floor into the cooling medium present in the sump 11, which accumulates on the floor of the vacuum chamber.

The vapor condenses to a condensate along the channel floor 10 or on the further path in the direction of the surface of the cooling medium. Alternatively the end of the channel floor can dip into the cooling medium. The cooling medium is cycled via a cooling medium discharge stub 55 in a cooling medium discharge conduit 56, which is directed to the heat exchanger 16. The cooling medium flows through the heat exchanger and is cooled. The cooling medium is guided from the heat exchanger by a cooling medium supply conduit 12 to a recirculation pump 60, which supplies the cooling medium to the cooling medium supply stub 54. The cooling medium circuit can contain at least one closing device 61 to interrupt the operation of the cooling medium circuit. The closing means 61 can comprise a throttle valve to control the throughput through the cooling medium cycle. Alternatively or in addition thereto a cooling medium valve 14 can be provided which can decrease the cooling medium stream through the heat exchanger to increase the residence time in the heat exchanger or to increase the throughput to decrease the residence time in the heat exchanger. The throughput of the cooling medium through the heat exchanger as well as the cycled cooling medium volume can be controlled by means of the cooling medium valve 14 and/or the closing means based on the temperature measurement of the cooling medium or a level measurement of the cooling medium.

Superfluous condensate can be discharged from a condensate discharge conduit 13 from the system. The condensate discharge conduit is used also to discharge periodically the contaminants accumulating in the cooling medium from the system.

The air of low vapor content is guided over a separation element 29 arranged in the separation chamber 28. The vapor stream which moves from the sump 11 in the direction of the separation chamber 28 can form a splash layer on the liquid surface.

In order to avoid that water splats reach the upper portion of the separation chamber 28 and the vacuum conduit, the separation element 29 is used. This separation element can be a droplet separator such as a perforated plate, a mesh or knit fabric in which the droplets are retained. A plurality of such separation elements can be arranged in series and/or one above the other. The air with reduced water vapor content is evacuated into the vacuum conduit 6 and enters the vacuum pump 3.

Alternatively or in addition to the separation element a heat exchanger can be provided in the separation chamber. This heat exchanger can be part of the cooling medium circuit. In particular the heat exchanger can be used to preheat the air flow of low vapor content entering the vacuum pump 3 to cool the cooling medium or to cool the cooling medium further.

Furthermore or alternatively to the preceding embodiment or in addition thereto a cooling coil can be provided in the sump, which comprises ribbed tube elements. These ribbed tube elements are protected against damage advantageously by an intermediate floor or by a fixedly installed chamber floor 30 which can be removed only for assembly or maintenance works. If the ribbed tube elements are freely accessible the danger exists that these tube elements are trodden upon by personnel responsible for cleaning. The ribbed tube elements are not designed to support such a load, in particular if the ribs are configured as thin walled sheet parts.

The invention claimed is:

1. A vacuum cooling device for the cooling of foodstuff, comprising:
   a vacuum chamber containing a product chamber for receiving the foodstuff for its cooling and a separation chamber;
   a vacuum source which is connected to the separation chamber; and
   a vapor condenser for condensation of vapor generated during the cooling process in the product chamber whereby the vapor condenser is arranged below the product chamber; and
   wherein the vapor condenser comprises a cooling medium sump and a vapor introduction element, and whereby the vapor introduction element comprises a plurality of channels or tube elements or a plate element arranged as to extend partially into cooling medium of the cooling medium sump for introducing the vapor from the product chamber into the cooling medium,
   and wherein, relative to vacuum draw of the vacuum source, the product chamber is arranged upstream of the vapor condenser, and the sump and vapor introduction element of the vapor condenser are arranged upstream of the separation chamber.

2. A vacuum cooling device according to claim 1, whereby the vapor introduction element is arranged below a chamber floor of the product chamber.

3. A vacuum cooling device according to claim 1, whereby the vapor condenser is configured as a portion of the vacuum chamber.

4. A vacuum cooling device according to claim 1, whereby a control unit is provided for controlling the amount of condensed water and/or the condensed water temperature.

5. A vacuum cooling device according to claim 1, wherein a separation element is arranged in the separation chamber, whereby the separation element includes one of a wall of the separation chamber or a perforated sheet, a mesh or knit fabric.

6. A vacuum cooling device according to claim 1, wherein the vacuum source comprises a vacuum pump.

7. A vacuum cooling device according to claim 1, wherein the sump contains a heat exchanger, or a heat exchanger is arranged externally of the sump, whereby the cooling medium can be cooled by the heat exchanger, whereby the cooling medium can be cycled in a closed cycle through the heat exchanger.

8. A vacuum cooling device according to claim 6 wherein the vacuum pump is a controlled rotary speed vacuum pump.

9. A vacuum cooling device according to claim 1 whereby the vapor condenser is configured as a filter path for retaining contaminants from the vapor.

10. A vacuum cooling device according to claim 9 whereby the vapor condenser receives the cooling medium in the filter path for retaining contaminants from the vapor.

11. A vacuum cooling device according to claim 1 wherein the vapor introduction element includes a plate configured as a sloped ramp extending below a chamber floor of the product chamber.

12. A vacuum cooling device for the cooling of foodstuff, comprising:
 a vacuum chamber containing a product chamber designed to receive the foodstuff;
 a separation chamber;
 a vacuum source which is connected to the separation chamber;
 a vapor condenser for condensation of vapor generated during the cooling process in the product chamber whereby, when the vacuum cooling device is in operation, the vapor condenser is arranged below the product chamber, and wherein the vapor condenser comprises a cooling medium sump and a vapor introduction element for introducing the vapor from the product chamber into cooling medium of the cooling medium sump,
 and wherein, relative to vacuum draw of the vacuum source, the product chamber is arranged upstream of the vapor condenser, and the sump and vapor introduction element of the vapor condenser are arranged upstream of the separation chamber.

13. A vacuum cooling device according to claim 12, whereby the product chamber includes a chamber floor and the vapor introduction element is arranged below the chamber floor.

14. A vacuum cooling device according to claim 12 whereby the vapor condenser is configured as a portion of the vacuum chamber.

15. A vacuum cooling device according to claim 12, whereby a control unit is provided for controlling the amount of condensed water and/or the condensed water temperature.

16. A vacuum cooling device according to claim 12 wherein the vapor introduction element is arranged to extend above and below a surface of the cooling medium of the vapor condenser.

17. A vacuum cooling device according to claim 12, wherein a separation element is arranged in the separation chamber.

18. A vacuum cooling device according to claim 17 whereby the separation element includes one of a wall of the separation chamber or a perforated sheet, a mesh or knit fabric.

19. A vacuum cooling device according to claim 12, wherein the vacuum cooling device is a bakery product cooling device.

20. A vacuum cooling device according to claim 1, wherein the cooling medium sump is in heat exchange communication with a heat exchanger, and whereby the cooling medium is cooled by the heat exchanger, whereby the cooling medium can be cycled in a closed cycle through the heat exchanger.

* * * * *